Dec. 24, 1940.　　B. L. SIMPSON　　2,226,023
BATTERY PASTE MULLER
Filed June 20, 1938　　7 Sheets-Sheet 1

INVENTOR
BRUCE L. SIMPSON
BY
ATTORNEYS.

Dec. 24, 1940.  B. L. SIMPSON  2,226,023
BATTERY PASTE MULLER
Filed June 20, 1938  7 Sheets-Sheet 2

INVENTOR
BRUCE L. SIMPSON
BY
Toulmin & Toulmin
ATTORNEYS

Dec. 24, 1940.　　　　B. L. SIMPSON　　　　2,226,023
BATTERY PASTE MULLER
Filed June 20, 1938　　　7 Sheets-Sheet 3

INVENTOR
BRUCE L. SIMPSON
BY Toulmin & Toulmin
ATTORNEYS

Dec. 24, 1940.　　B. L. SIMPSON　　2,226,023
BATTERY PASTE MULLER
Filed June 20, 1938　　7 Sheets-Sheet 4

INVENTOR
BRUCE L. SIMPSON.
BY
ATTORNEYS.

INVENTOR
BRUCE L. SIMPSON.
BY Toulmin & Toulmin
ATTORNEYS.

Dec. 24, 1940.  B. L. SIMPSON  2,226,023
BATTERY PASTE MULLER
Filed June 20, 1938    7 Sheets-Sheet 7

INVENTOR
BRUCE L. SIMPSON.
BY *Foulmin & Foulmin*
ATTORNEYS.

Patented Dec. 24, 1940

2,226,023

UNITED STATES PATENT OFFICE 2,226,023

BATTERY PASTE MULLER

Bruce L. Simpson, Chicago, Ill., assignor to Herbert S. Simpson, Chicago, Ill.

Application June 20, 1938, Serial No. 214,769

7 Claims. (Cl. 83—45)

This invention relates to a machine for the mulling and mixing of pastes and the like.

In particular it relates to a machine for intensive mixing of battery pastes for the making of plates of storage batteries.

It is an object of this invention to provide a muller mechanism for intensive mixing of plastic and semi-plastic materials which will provide for the mulling action on the paste by incorporating liquids with dry materials, which will prevent the pastes and materials from adhering to the mixing pan and the muller wheels, and which will deliver the liquids, particularly corrosive liquids, into the paste in the proper position for mulling. Such introduction must be effected in a manner not to injure the mulling mechanism, and in a manner to provide for the proper cooperative action between the muller wheels and the scrapers.

It is a further object to provide means of controlling the gases and fumes arising from the operation and of controlling the dust.

It is an object to provide means of controlling the three functions of mulling, liquid introduction and dry material introduction, and the condition of the atmosphere above the muller.

It is a further object to provide means for controlling the temperature of the material being mulled and mixed at different stages and for controlling the air circulation, depending upon the condition of the material as to whether it is dry or wet.

It is an object to effect cooling without any water connections and without any expensive water jacketing of the crib and bed plate.

It is a further object to provide for protection against the corrosive action of acids for those parts that come in contact with the acid before neutralization thereof upon engagement with the lead oxide; it is necessary to provide a design of piping for directing the flow of this acid behind the plow and in front of the muller.

It is a further object to provide metals of the requisite characteristics and hardness, namely, Monel metal for the outside plow which scrapes the material from the base and side of the pan and Monel metal for the inside of the plow, which is adjusted close to a turret and the bottom of a muller pan.

It is a further object of this invention to provide means of regulating the application of the weight of the muller wheels upon the pan, while at the same time permitting the wheels to touch the pan.

It is a further object of this invention to completely eliminate any contamination of the workers by the complete exhaustion of the lead oxide dust and at the same time cooling the contents by the air exhaust system without the expense of water jacketing and the like.

It is a further object to provide a housing for the crosshead around the liquid funnel so as to prevent material from falling or being dropped into the mechanism and to allow the machine to be cleaned easily.

Referring to the drawings.

Referring to the drawings in detail, 1 designates a driving motor which drives through a shaft 2 a beveled pinion 3 which in turn drives a bevel gear 4 that is attached to the bottom of a shaft 5. This shaft 5 is mounted within a bearing 6 formed within a sleeve 7 which is a downward extension of the bottom of the muller pan designated 8. The bottom of this pan is provided with depending ribs 9 having horizontal bearing sleeves 10 for supporting the bearings 11 that in turn support the opposite ends of the shaft 2. Thus a rigid, aligned structure is provided by which the shafts and associated gearing are rigidly positioned because supported in bearings in a common casting. Mounted on the floor 8 of the bottom is the wear plate 12. The side flanges 13 support the cylindrical side walls 14 of the muller pan.

Figure 4:
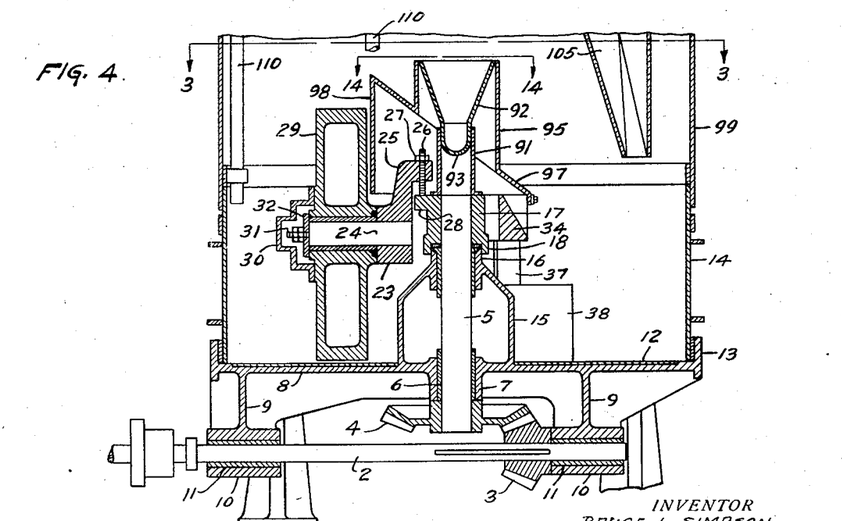
Figure 4 is a section on the line 4—4 of Figure 3 looking in the direction of the arrows.

The center of the bottom casting 8 is projected upwardly in turret form as at 15 which terminates in an inwardly disposed bearing 16 for guiding the upper or intermediate portion of the shaft 5. Mounted upon the shaft 5 is a cap member 17 which has a depending skirt 18 overlapping the top of the bearing 16 to prevent any material entering between the shaft and the bearing. The cap member 17 is in the nature of an arbor which has mounted on one side a bearing sleeve 19 in which is mounted a cross shaft or axle 20 that serves to support at one end a rocking muller arm 21 which has a sleeve 22 mounted on the axle 20 and on the other end it has a sleeve 23 for supporting the muller axle 24. The muller arm 21 is provided with an upwardly extending and laterally projecting bracket 25 provided with an adjustable bolt 26 which is positioned and locked by the nut 27. The lower end of this bolt rests upon a ledge 28 on the cap or arbor 17 so as to position the muller wheel 29 so that it touches the surface of the wear plate 12 but does not rest its full weight thereon. In Figure 4 the muller wheel is shown slightly away from the wear plate 12 for the purpose of illustration.

The muller wheel 29 is mounted upon the axle 24. The end of the axle is preferably provided with a cap 30 for protecting the adjusting screw 31, which retains the plate 32 that holds the wheel 29 against the sleeve 23 and upon the axle 24.

The other end of the axle 20 is used to support through the sleeve 33 the scraper arm 34. One end of this arm at 35 extends to a point adjacent the inside of the side wall 14. A jaw 36 adjustably supports a vertical plow carrier 37, on the bottom of which is bolted a plow 38 which engages with the inside of the wall 14 and extends inwardly therefrom non-radially.

Figures 12, 13, 14:
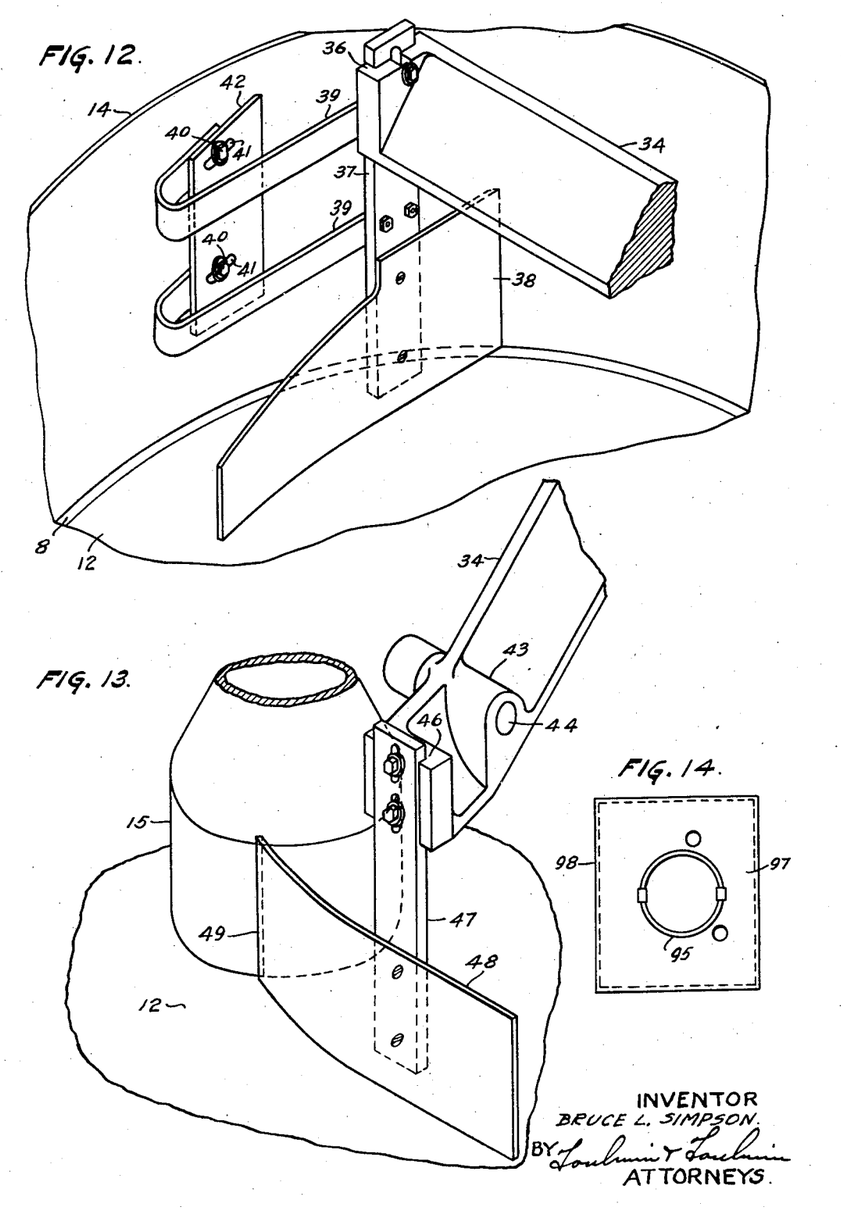
Figure 12 is a perspective of the inside of the muller pan showing the adjustable scrapers and one form of a resilient support for the upper scraper and also showing the outside plow.
Figure 13 is a perspective of the mechanism supporting the inside plow adjacent the turret.
Figure 14 is a plan view taken on the line 14—14 of Figure 4 looking in the direction of the arrows showing in plan the crosshead housing.

Mounted upon this depending member 37 is a pair of spring arms 39 which have bolted thereto by bolts 40 located in slots 41 an upper scraper blade 42.

This same arm 34 is supported at its other end by a sleeve 43 upon an axle 44 which is mounted within a sleeve 45 oppositely disposed from the sleeve 19 on the head 17. Beyond the sleeve 43 is a vertically disposed groove 46 for adjustably supporting a bar 47, the lower end of which supports the inner plow 48 the inner end of which at 49 engages with and scrapes the material from the exterior of the turret 15.

Figure 6:
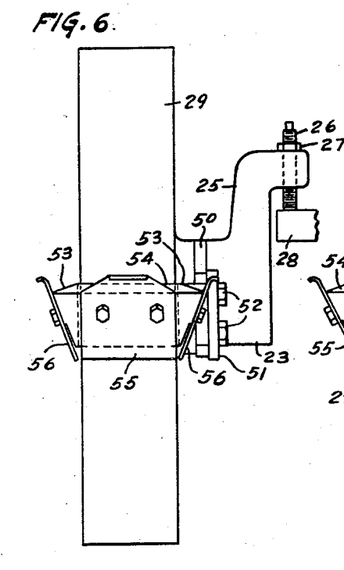
Figure 6 is a detailed edge elevation of a muller wheel and its associated scrapers showing one type of scraper.
Figure 7:
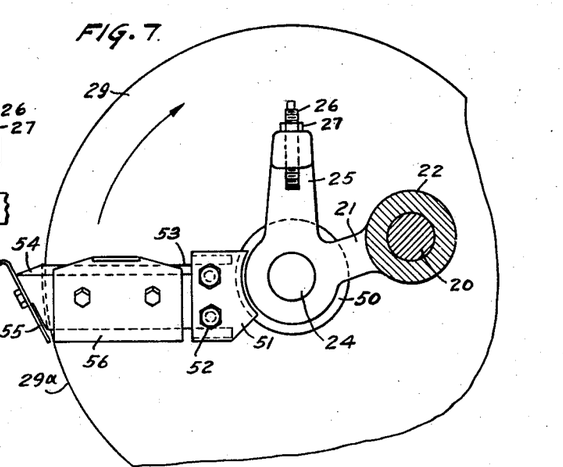
Figure 7 is a side elevation of Figure 6 showing the muller wheel axle with the bracket partly in section.
Figure 8:
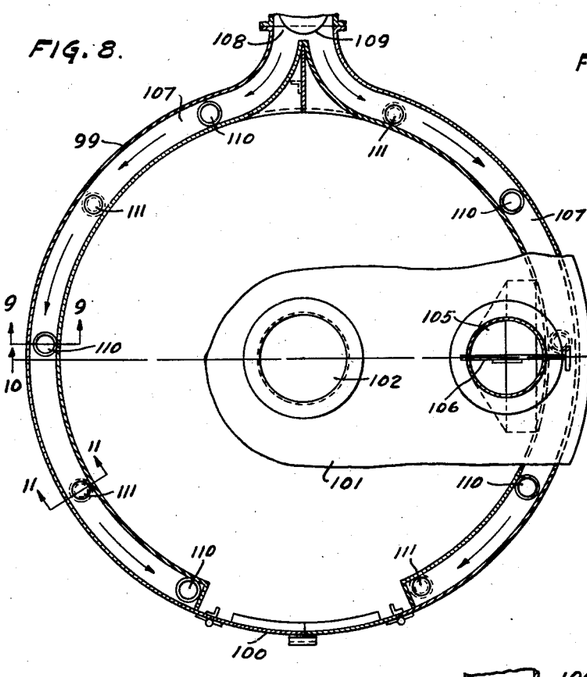
Figure 8 is a section on the line 8—8 of Figure 10 showing the air distribution system in section and a part of the cover in plan view.
Figure 9:
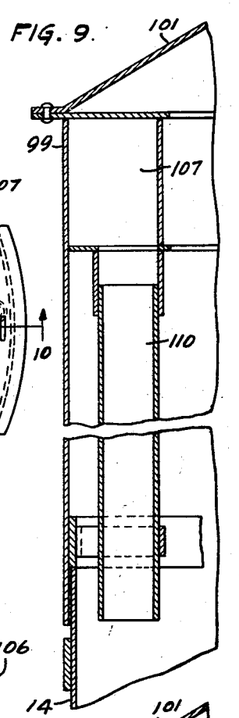
Figure 9 is a section on the line 9—9 of Figure 8 looking in the direction of the arrows showing one of the air distribution tubes.
Figure 10:
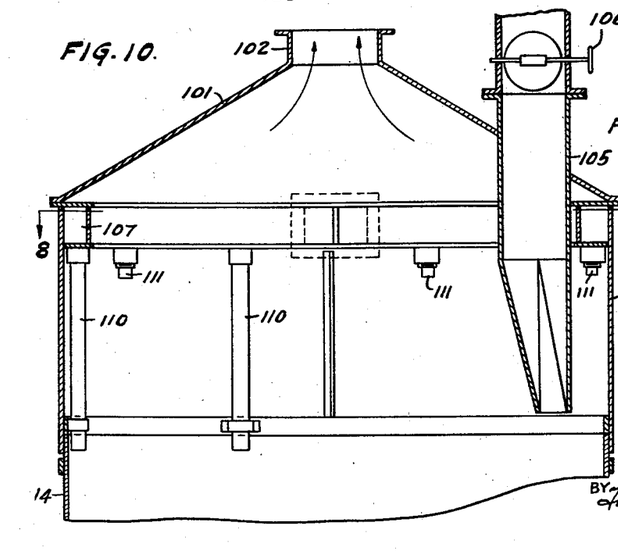
Figure 10 is a section on the line 10—10 of Figure 8 looking in the direction of the arrows.
Figure 11:
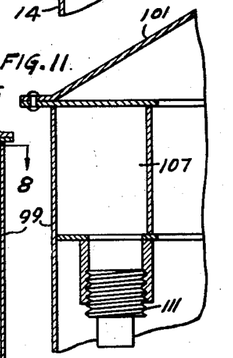
Figure 11 is a section on the line 11—11 of Figure 8 looking in the direction of the arrows showing one of the air tubes plugged to render it temporarily inoperative.
Figure 17:
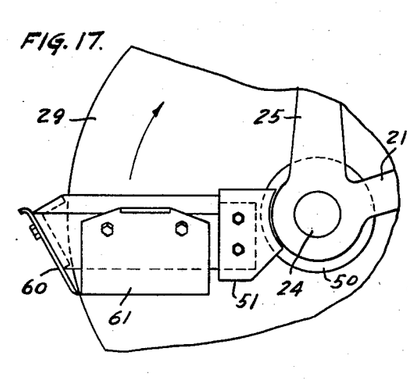
Figure 17 is a similar view showing another modification of the scraper with an adjustable outside scraper on the outside of the V-shaped guard.
Figure 18:
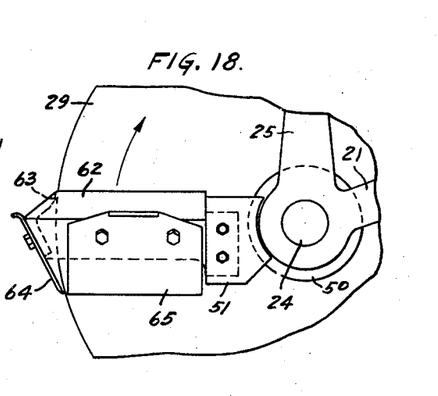
Figure 18 is a similar view showing a different form of V-shaped guard having a sharp scraping flange adjacent to the periphery of the muller wheel.
Figure 19:
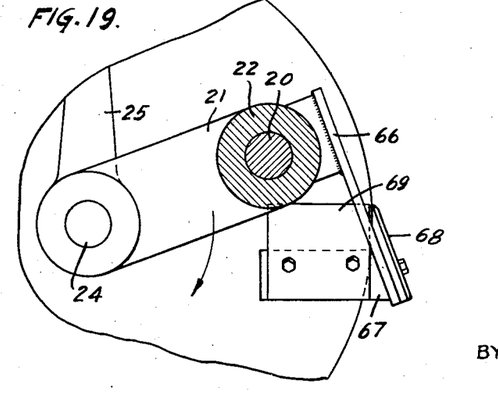
Figure 19 shows an inverted form of scraper which is the preferred form for use with battery plate pastes.

The scraper mechanism for the muller wheel may be of the type shown in Figures 6 and 7 and the modifications in Figures 15 to 18, in which the upwardly moving wheel is engaged by a downwardly extending scraper, or the preferred form may be employed as in Figure 19 where there is a downwardly moving wheel and an upwardly directed scraper. With many types of material of plastic character, the form shown in Figure 19 is preferred as it is self-cleaning.

Referring to Figures 6 and 7, the muller axle 24 has a sleeve 50 mounted thereon between the wheel 29 and the bracket 25. This sleeve has a laterally extending arm 51 upon which is bolted by the bolts 52 an angular scraper support having side bars 53 and end bars 54. A scraper 55 is mounted on the end bar 54 for scraping the periphery 29a and the scraper 56 is mounted on a side bar 53 for scraping the side of the muller wheel 29.

Figure 15:
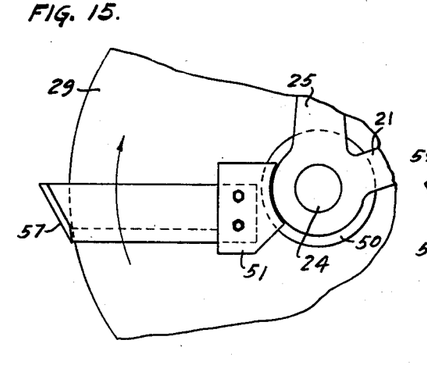
Figure 15 is a modified form of muller wheel scraper.
Figure 16:
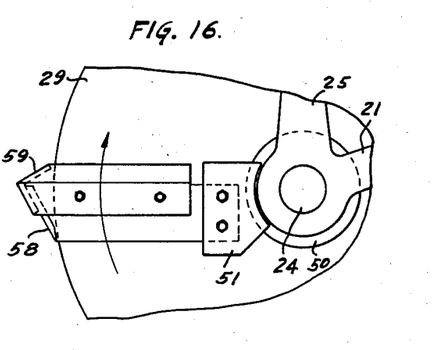
Figure 16 is a view of another modified form of muller scraper with the scraper blade on the inside of the V-shaped guard.

In Figure 15 the scraper 57 is a rigid member. In Figure 16 the scraper 58 is mounted on the inside of a V-shaped support designated 59. A similar V-shaped support is shown in Figure 17 with a scraper 60 adjustably supported on the outside thereof. The side scrapers are designated 61.

In Figure 18 the V-shaped support 62 has a sharp upper edge 63 to prevent foreign material from adhering to the wheel and from falling in between the wheel and the scrapers 64 and 65.

In Figure 19 there is provided a bracket 66, at the lower end of which is a frame 67 for supporting the periphery of the scraper 68 in an inverted position and the side scraper 69 in inverted position so that the material is scraped off the periphery of the downwardly moving wheel and falls directly back into the batch. The space beneath the scraper is automatically self-cleaning due to the effect of gravity thereon.

Figures 20, 21:
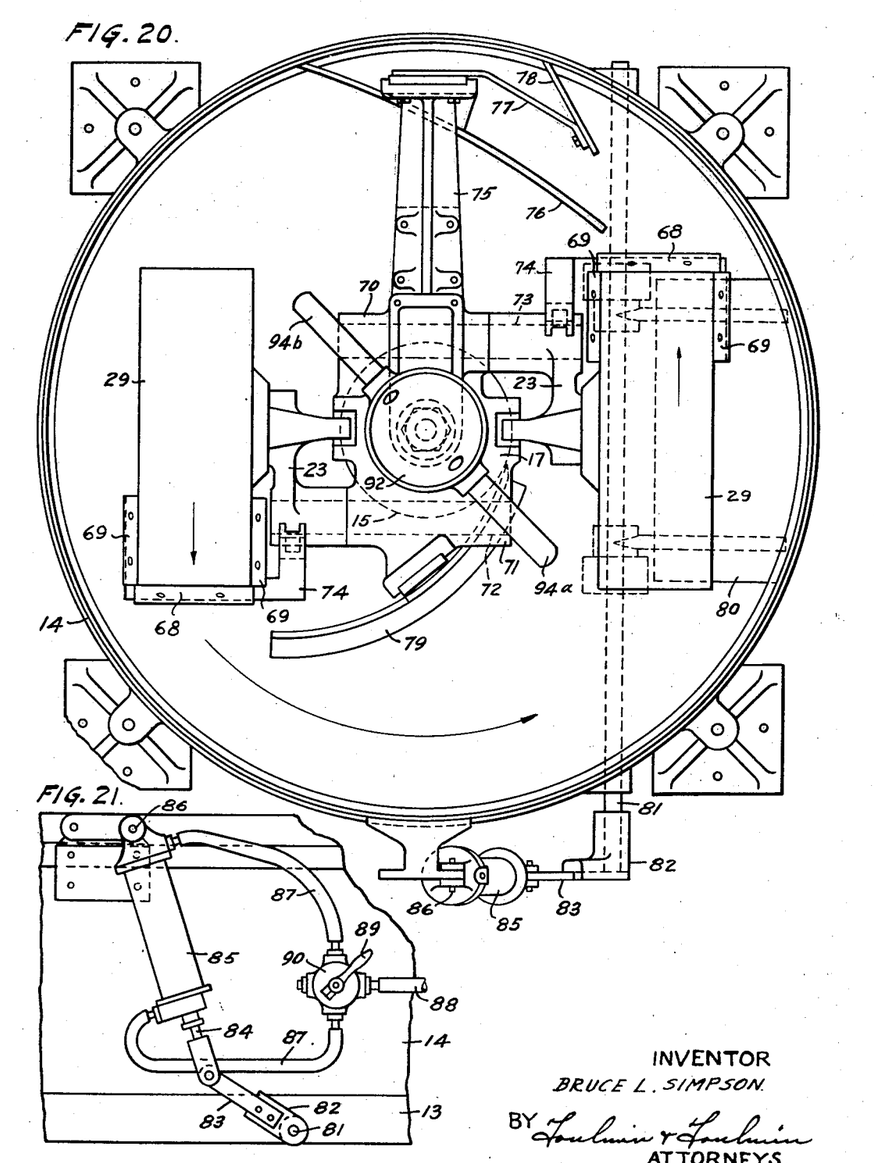
Figure 20 is a top plan view of a modified form of a muller showing a dual wheel construction and a dual distributor system for corrosive liquids.
Figure 21 is a side elevation of the pan showing the mechanism for opening and closing the bottom doors of the muller pan.

In Figures 20 and 21 there is shown a modified form of muller in which the driving head or arbor 17 is provided with oppositely disposed sleeves 70 and 71 in which are mounted axles 72 and 73 for supporting the heretofore described muller arms that support the mullers 29. The construction is otherwise substantially the same. In this instance, however, the brackets 74 which are mounted upon the inner sleeves of the bracket arms 23 support the scrapers heretofore described.

The outside plows for scraping the outside portion of the bottom of the pan and for scraping the inside of the side wall of the pan are mounted upon a centrally disposed arm 75, the outer end of which carries the lower scraper 76 and the bracket 77 that carries the wall scraper 78.

The sleeve 71 carries the inner or turret plow 79.

The dumping mechanism for these mullers consists of a bottom door 80 which is mounted upon a rod 81 on the end of which is a bracket 82 carrying a lever 83. This lever is pivoted to a piston rod 84 connected to a piston and cylinder 85 which is pivotally mounted at 86 upon the muller. The respective ends of the piston are connected by fluid pressure pipes 87 to a main supply 88. The direction of application of fluid pressure is determined by the setting of the valve handle 89 controlling the valve 90.

*Liquid supply system*

Figure 3:
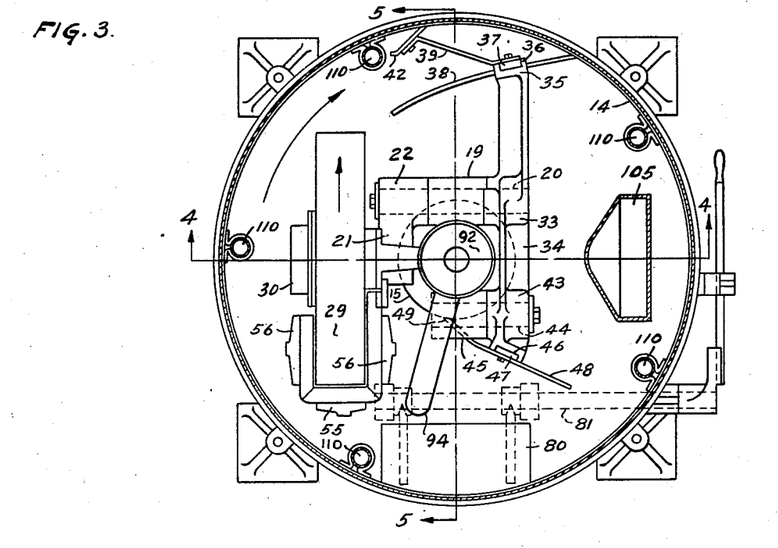
Figure 3 is a section on the line 3—3 of Figure 4 looking in the direction of the arrows.
Figure 5:
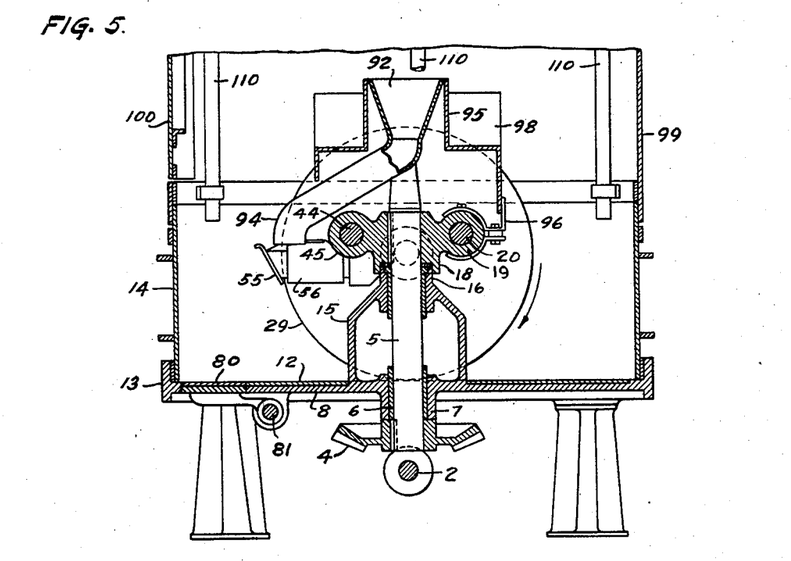
Figure 5 is a section on the line 5—5 of Figure 3 looking in the direction of the arrows.

Returning to Figures 3 to 5, the cap or arbor member 17 is provided with a vertically disposed pipe 91. This in turn supports on its upper end a funnel 92, the bottom of which is closed at 93 and from which leads a laterally disposed pipe 94 that is arranged to discharge mixing liquid such as sulphuric acid into the muller pan. In order to protect the surrounding mechanism from any splashing or spilling of the acid, a housing 95 is supported by the bracket 96 upon the sleeve 19 and its associated sleeve. This housing has a diagonally disposed portion 97 for directing any such materials into the muller pan while at the same time protecting by the skirts 98 the muller operating mechanism.

As will be seen in Figure 20, this funnel 92 may be provided with oppositely disposed pipes such as 94a and 94b.

*Exhaust and cooling system*

It will be understood that in the handling of finely divided materials such as lead oxide, it is necessary to provide some means of carrying away the fines to prevent both the loss of the finely divided materials and to prevent injury to the workers due to lead poisoning. It is also desirable to prevent the disposition of the finely divided materials in the exhaust pipe. It is desirable to control the temperature and the conditions of pressure and vacuum within the muller chamber according to the different stages of the process of manufacture of the battery pastes.

Figures 1, 2:
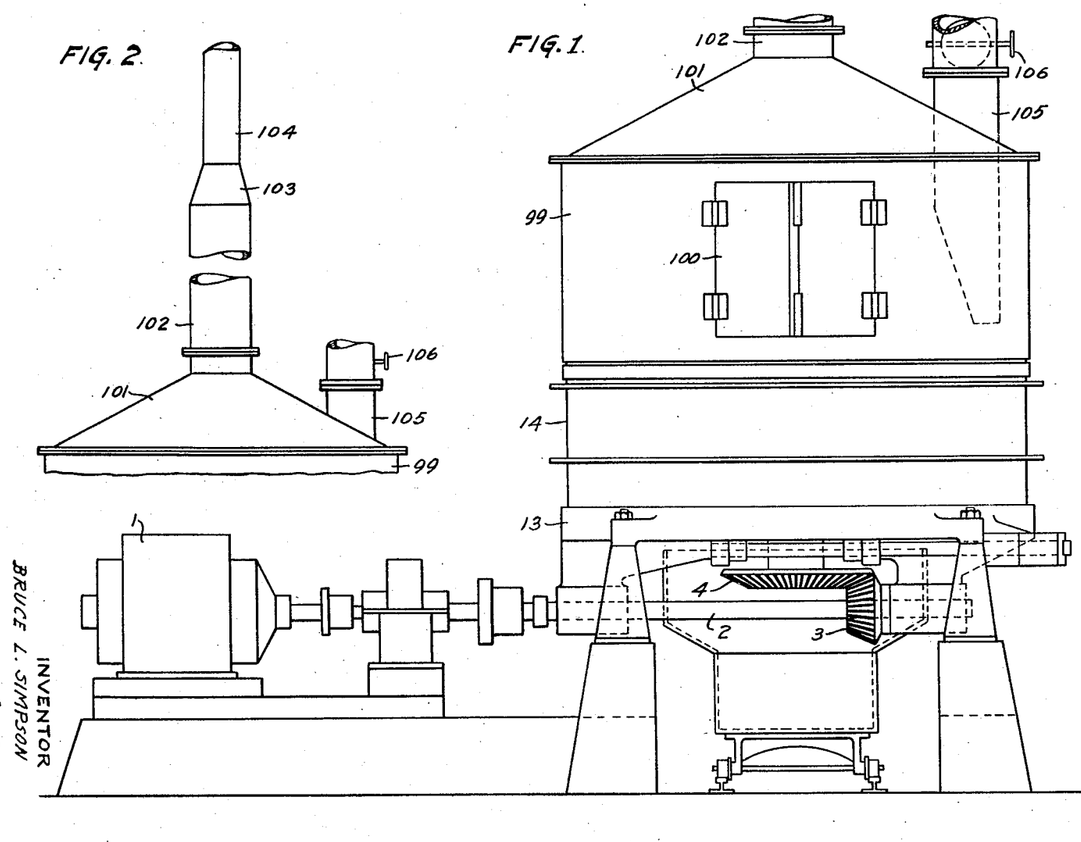
Figure 1 is a side elevation of the complete apparatus.
Figure 2 is a detailed view of the upper part of the exhaust system to show the reduction in size of the exhaust pipe to increase air velocity and to prevent the settling of fines in the pipe.

For these several purposes there is provided an annular wall 99 having side doors 100. This enclosure is covered by a conical roof 101, to the center of which is connected a large exhaust pipe 102 which decreases in diameter at 103 so as to increase the air velocity and prevent the settling of fines in the pipes. The pipe 104 is connected to a suitable exhaust system for creating the desired movement of air. Either air or raw materials may be introduced into the muller through the pipe 105 which is optionally controlled by a valve 106. Either raw materials or air may be controlled by this valve. It is therefore possible not only to exhaust the fines and also the fumes from the reaction taking place in the muller chamber, but it is also possible to create a vacuum, which is desirable at certain stages of the process.

In order to bring about a cooling of the contents of the muller, there are provided opposed semi-circular chambers 107 which communicate at 108 with the source of air pressure. Air pressure is controlled by the valve 109. The air under pressure escapes from the chambers 107 through the depending open-ended pipes 110. The alternate pipes 110 are closed with a plug 111 which may be optionally removed so as to regulate the total volume of air delivered under pressure. The air so delivered also facilitates the evacuation of the dust and fumes through the pipes 102, 103 and 104. This system of air cooling eliminates water jacketing. It is also helpful in connection with those reactions where additional air is desirable. It facilitates the evacuation of the lead dust and increases the velocity of the air in the evacuation pipes to prevent the settling of this fine dust.

It will be understood that in the manufacture of battery paste, it is necessary to provide a very uniform product. The mulling of this paste continuously with the introduction of the acid at the point indicated insures equal treatment of all components of the mix while at the same time controlling its temperature and removing dust which otherwise might be mixed with the mixture. The mixture taking place in the presence of the air provides for adequate ventilation and supply of air to insure thorough and uniform porosity of the paste, which increases the efficiency of the battery cell. In a battery the reaction upon which the efficiency of the battery depends is in direct proportion to the accessibility of all parts of the plate to the electrolyte. The uniformity of porosity is therefore an important factor in battery activity and uniformity of performance.

This machine has effected over previous efforts to mix such materials a considerable reduction in horsepower; a reduction in mixing time from two hours to one-half hour; and has permitted a high reclaim of lead oxide for remixing purposes. It provides means of mulling and plowing and turning the material in an atmosphere which is the cooling agent itself so that all parts of the mixture are uniformly cooled, which is not the case where external water cooling of the pan is practiced. As the machine is self-cleaning, it is possible to mix successfully both negative and positive battery paste in one machine.

It should be understood, however, that when it is referred herein to battery paste, this reference is merely one by way of illustration and there is no intent to confine this apparatus solely to the use of manufacturing battery pastes, as a great variety of products can be successfully manufactured by it.

It will be understood that it is desired to comprehend within this invention such modifications as come within the scope of the claims and the invention.

Having thus fully described my invention, what I claim as new and desire to secure by Letters Patent, is:

1. In combination, in a muller for mulling solid materials with liquids, a muller pan, side walls for said muller pan, a muller wheel, means of supporting and driving said muller wheel so that it can bodily move about its driving means and can rotate on its own axis, means of supporting said muller wheel so that less than the full weight of said muller wheel is rested upon said muller pan, means for introducing liquid to be mulled with said solid materials into said muller, an enclosure mounted over said side walls, an annular air chamber inside said enclosure and adjacent the outer edges of said side walls, said annular air chamber having air outlets for leading air downwardly into the muller into contact with and inwardly over the material being mulled, means of introducing cooling air under pressure to said air chamber, and means connected to said enclosure centrally thereof for exhausting air and dust from said enclosure, whereby the material being mulled by said muller is cooled and the air within said muller is retained free of contaminating dust.

2. In combination, in a muller for mulling solid materials with liquids, a muller pan, a muller wheel, means of supporting and driving said muller wheel so that it can bodily move about its driving means and can rotate on its own axis, means of supporting said muller wheel so that less than the full weight of said muller wheel is rested upon said muller pan, scrapers which are stationary relative to said muller wheel and which are angularly disposed and extending upwardly and inwardly against the downwardly moving sides and periphery of said muller wheel whereby to scrape material therefrom whence it drops by gravity, means for introducing liquid to be mulled with said solid materials into the muller, and means for circulating a cooling gas over the muller pan and materials undergoing mulling.

3. In combination, in a muller for mulling solid materials with liquids, a muller pan having a bottom and a side wall and having a turret in its center, a muller wheel, means of supporting and driving said muller wheel so that it can bodily move about its driving means and can rotate on its own axis, means of supporting said muller wheel so that less than the full weight of said muller wheel is rested upon the bottom of said muller pan, an inner scraper which moves about said driving means with said muller wheel and which engages with the inner bottom and said turret, an outer scraper which moves about said driving means with said muller wheel and which engages the outer bottom and inner side wall of said muller pan, scrapers which are stationary relative to said muller wheel and which are upwardly angularly disposed against the sides and the periphery of the downwardly moving side of said muller wheel, means for introducing liquid into said muller pan, and means for circulating cooling air over the surface of the muller pan and of the materials being mulled during the mulling.

4. A muller comprising a muller pan, an annular side wall for said pan, a muller wheel in said pan adapted to mull materials placed thereupon, a hood for said pan having an annular side wall resting on said pan side wall and a centrally converging roof on said hood side wall, means carried by said hood side wall for introducing a cooling gas at a plurality of points around the periphery of said side walls so as to direct it downwardly adjacent the inner periphery of said pan side wall onto said pan, thence inwardly over said pan to the center thereof and thence upwardly centrally thereof, and exhaust means located centrally of said roof and communicating with the interior of said muller for withdrawing said cooling gas upwardly from the center of said muller.

5. A muller comprising a muller pan, a muller wheel therein, means for revolving said wheel in said pan about a central axis thereof, means for allowing said wheel to move vertically in passing over material in said pan and to rotate about its own axis as it is so revolved, means forming with said pan an enclosure extending upwardly of said pan, said enclosure having an annular side wall, a plurality of air pipes disposed closely adjacent the inner face of said side wall and adapted to project cooling air downwardly at a plurality of spaced points around the periphery of said side wall onto the surface of said pan and thence inwardly towards the center over the material and the pan, and means for thence withdrawing the air upwardly from the casing at a central point whereby said muller and the material being mulled are cooled.

6. A muller comprising a muller pan, a muller wheel therein, means for revolving said wheel in said pan about a central axis thereof while allowing said wheel to rise and fall and rotate about its own axis in passing over material in said pan, an annular side wall for said pan, an enclosure mounted over said side wall and said pan and cooperating therewith to airtightly enclose the interior of said muller, means centrally of said enclosure and said pan for upwardly exhausting the gas from within the enclosure thus formed, and means for introducing cooling gas into said inclosure at a plurality of points around the periphery of said side wall in such manner as to direct it onto the material on the pan, thence inwardly over the material and thence upwardly into said exhausting means.

7. A muller comprising a muller pan, a crosshead mounted so as to be rotatable in said pan about a central axis thereof, a rocker arm rockingly mounted on said cross-head, a muller wheel mounted on said arm so as to be rotatable about its own central axis, conduit means movable with said cross-head and extending radially outwardly from said central axis of said pan for delivering liquid downwardly onto said pan, a scraper engaging said pan and carried by said cross-head rearwardly of the point of discharge of said conduit means and arranged to direct the liquid so discharged and the solid material being mulled outwardly into the path of said muller wheel, and a scraper for said muller wheel mounted on said rocker arm and engaging the downwardly moving side of said wheel upwardly angularly thereagainst.

BRUCE L. SIMPSON.